Figures 1, 2, 3, 4:
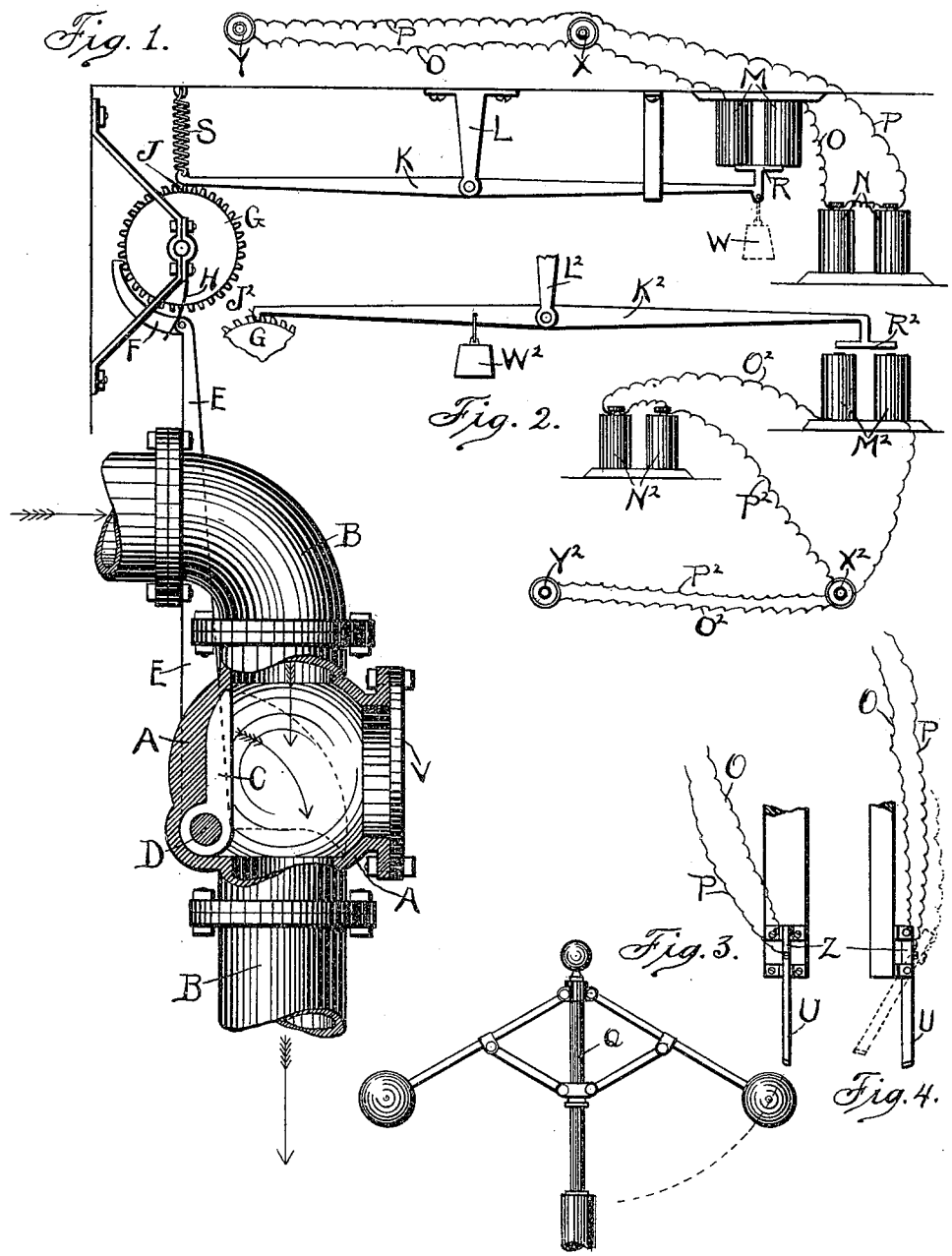

No. 659,134. Patented Oct. 2, 1900.
F. W. CHURCHOUSE & H. O. BENEDICT.
SELF CLOSING VALVE FOR STEAM PIPES.
(Application filed Jan. 25, 1899.)
(No Model.)

WITNESSES:
L. A. Nicholson
J. J. Sexton

INVENTORS:
Frank W. Churchouse
H. Oscar Benedict
BY
G. W. Bullard
ATTORNEY.

United States Patent Office.

FRANK W. CHURCHOUSE, OF TACOMA, AND HENRY OSCAR BENEDICT, OF SEATTLE, WASHINGTON.

SELF-CLOSING VALVE FOR STEAM-PIPES.

SPECIFICATION forming part of Letters Patent No. 659,134, dated October 2, 1900.

Application filed January 25, 1899. Serial No. 703,310. (No model.)

*To all whom it may concern:*

Be it known that we, FRANK W. CHURCHOUSE, residing at Tacoma, in the county of Pierce, and HENRY OSCAR BENEDICT, residing at Seattle, in the county of King, in the State of Washington, citizens of the United States, have invented an Improvement in Self-Closing Valves for Steam-Pipes, of which the following is a specification.

Our invention pertains to valves for suddenly stopping steam-engines, and has for its object the providing of means whereby the supply of steam to an engine may be shut off and the engine be stopped suddenly, said means consisting of a self-closing valve having a lever-arm so connected with a magnetic tripping device that the valve may be closed from any distance by an electric push-button in case of an accident or other emergency in the shop, mill, steamship, or structure in which the power of the engine is distributed, all for the purpose of saving time and delay usually necessary to notify the engineer and for him to stop the engine.

Our invention further provides a means for closing the valve automatically in case the engine should from any cause attain a dangerous speed, and thus stop the same before any damage could result therefrom.

We attain these results by means of the mechanism illustrated in the accompanying drawings, in which—

Figure 1 is an elevation of our complete device, the self-closing valve being shown in section to exhibit the construction of the same. Fig. 2 illustrates a supplemental means for tripping the self-closing valve. Fig. 3 illustrates an automatic device for tripping the valve by means of a centrifugal governor. Fig. 4 is a side view of tripping-switch used in Fig. 3.

Similar letters refer to similar parts in the several views.

Our device comprises a globe-shaped valve A, fitted in the line of steam-pipe B, which conducts the steam from the boiler to the engine. This valve is provided with a swinging gate C, fixed on a shaft D, that turns freely in the valve-case A at its ends. One end of this shaft extends to the outside of the valve-case and has the lever-arm E fixed thereto, by means of which the gate C is swung open or shut. On the outer end of this lever-arm is pivotally attached a curved hook F. A ratchet-wheel G is mounted near the valve in such a position that when the valve-gate is wide open, as shown in Fig. 1, the hook F may be engaged thereon and the valve kept wide open. A flat steel spring H, acting against the end of E, insures the engagement of the hook of F on the wheel G.

The wheel G being loosely mounted is held from turning by means of the lever-beam K, centrally mounted on a fixed support L and having a small tooth J at one end, which engages the teeth of the ratchet-wheel G. The tooth is held against G by means of the electromagnet M, which is magnetized from the battery N by means of the wires O and P in complete circuit.

The wires O and P are designed to be extended to any distance whence it is desired to close the valve. Any desired number of electric push-buttons or switches, as X and Y, are designed to be located at various parts of the mill, shop, steamship, or factory in which the valve is to be used. Each button covers a closed switch, and on pushing the same the switch is opened and the magnetic circuit is broken, causing the magnet to let go of the armature R, when the spring S lifts the opposite end of K, disengages the tooth J, and sets the wheel G free. The spring H now throws the lever-arm E to the right and swings the valve-gate C across the steam-pipe, which at once cuts out off the supply of steam and stops the engine.

It is to be observed that the push-button, being self-closing, reconnects the magnetic circuit at the time the finger is taken off it, when M at once attracts R and causes J to again engage the wheel G, when the valve may again be opened and F hooked in place, as before.

Our self-closing valve is designed to be a separate and independent attachment from the throttle-valve and is to be operated independently of it.

It is to be observed that our device is not limited to the exact arrangement shown in the drawings, but may be shifted or varied in the location of its several parts to permit of its attachment to a steam-pipe in any position whatever. When placed on a horizontal pipe, the lever-arm E may fall of its own weight and close the valve, or, if not heavy enough, a weight may be added thereto in place of the spring H, and to operate the lever K a weight may be used instead of the spring S, as indicated at W. The lever-arm K is also designed to be operated with a magnet $M^2$, located on a broken circuit of magnetic wires $O^2$ and $P^2$ and battery $N^2$. The push-buttons $X^2$ and $Y^2$ when used connect the circuit and cause $M^2$ to attract $R^2$ and disengage $J^2$, when the closing of the valve is the same as heretofore described, all of which is shown in Fig. 2.

We have further devised an automatic means for operating the self-closing valve, which is shown in Figs. 3 and 4. An electric switch Z, having a swinging extension-arm U, is designed to be located near the centrifugal governor Q of the engine in such a position that whenever from any cause the engine becomes uncontrollable and attains a dangerous speed the spreading of the arms of the governor resulting therefrom will cause them to come in contact with the extended arm U and open or close the circuit, as they are designed to do, and thus close the valve and stop the engine before any damage is done. It is to be observed the switch Z is to be on the same circuit as the push-buttons heretofore described.

The valve-case has an opening in one side covered with a plate V, which permits the same being opened and inspected or repaired at all times when not in use.

Having thus described our invention, what we claim as new, and desire to secure by Letters Patent, is—

1. A self-closing valve comprising a globe-shaped case, a rotatable shaft mounted in said case and having a lever-arm fixed to the outer end thereof, a swinging gate in said case and carried by said shaft, a ratchet-wheel with which said lever engages, a toothed arm pivotally mounted near its center and engaging said ratchet-wheel, and electrically-operated means for tripping said toothed arm, substantially as described.

2. In a self-closing valve, the combination with the valve-case and a swinging gate therein, of an arm connected with said gate and located outside of the case, a loosely-mounted ratchet-wheel with which said arm engages, a pivotally-mounted toothed arm engaging said ratchet, and an electromagnetic device operatively connected with said toothed arm for releasing the ratchet, substantially as described.

3. The combination with the valve and operating-lever connected therewith, said lever having a hook pivoted to its end, of the rotatable ratchet-wheel with which the end of said hook engages, means for causing said hook to exert a pressure on said wheel to turn the same, a second lever normally in connection with said ratchet-wheel to prevent it from turning, and electrical means for actuating said second lever to release said wheel and permit the movement of the same and the valve, substantially as described.

4. The combination with the valve and operating-lever connected therewith, of a rotatable wheel having connection with said lever, a second lever normally in connection with said wheel for holding the valve in one position, and electrical means for actuating said second lever to release said wheel and permit the movement of the valve, substantially as described.

In testimony whereof we affix our signatures in the presence of two witnesses.

FRANK W. CHURCHOUSE.
H. OSCAR BENEDICT.

Witnesses:
  G. W. BULLARD,
  HARRY COMPTON.